(12) United States Patent
Kim et al.

(10) Patent No.: US 9,991,018 B2
(45) Date of Patent: Jun. 5, 2018

(54) METHOD FOR MANUFACTURING CARBON CARRIER-METAL NANOPARTICLE COMPOSITE AND CARBON CARRIER-METAL NANOPARTICLE COMPOSITE MANUFACTURED THEREBY

(71) Applicant: LG CHEM, LTD., Seoul (KR)

(72) Inventors: Kwanghyun Kim, Daejeon (KR); Sang Hoon Kim, Daejeon (KR); Gyo Hyun Hwang, Daejeon (KR); Jun Yeon Cho, Daejeon (KR)

(73) Assignee: LG CHEM, LTD., Seoul (KR)

( * ) Notice: Subject to any disclaimer, the term of this patent is extended or adjusted under 35 U.S.C. 154(b) by 177 days.

(21) Appl. No.: 14/909,002

(22) PCT Filed: Jul. 31, 2014

(86) PCT No.: PCT/KR2014/007059
§ 371 (c)(1),
(2) Date: Jan. 29, 2016

(87) PCT Pub. No.: WO2015/016638
PCT Pub. Date: Feb. 5, 2015

(65) Prior Publication Data
US 2016/0163411 A1 Jun. 9, 2016

(30) Foreign Application Priority Data
Aug. 1, 2013 (KR) .................. 10-2013-0091405

(51) Int. Cl.
*B01J 21/18* (2006.01)
*H01B 1/04* (2006.01)
(Continued)

(52) U.S. Cl.
CPC ............. *H01B 1/04* (2013.01); *B22F 1/0022* (2013.01); *C01B 32/05* (2017.08); *C01B 32/152* (2017.08);
(Continued)

(58) Field of Classification Search
CPC ............... B01J 23/38; H01B 5/00; C09K 5/00
(Continued)

(56) References Cited

U.S. PATENT DOCUMENTS

| 2008/0090721 A1 | 4/2008 | Komoda |
| 2009/0266580 A1 | 10/2009 | Jung et al. |
| 2012/0097886 A1 | 4/2012 | Ramaprabhu et al. |

FOREIGN PATENT DOCUMENTS

| EP | 2939764 A1 | 4/2015 |
| JP | 2009164142 A | 7/2009 |

(Continued)

OTHER PUBLICATIONS

Mou, Jon, "Preparation, characterization and Property of Pt-based Graphene Fuel Cell Catalyst", Chinese Master's Dissertations Full-Text Database Engineering Technology II, No. 6; published in 2013, C042-836.
Lee et al., "Preparation of Pt nanoparticles on carbon nanotubes and graphite nanofibers via self-regulated reduction of surfactants and their application as electrochemical catalyst," Electrochemistry Communications 7(4): 453-458 (2005).
(Continued)

*Primary Examiner* — Khanh T Nguyen
(74) *Attorney, Agent, or Firm* — Dentons US LLP

(57) ABSTRACT

The present application relates to a method for preparing a carbon carrier-metal nanoparticle composite and a carbon carrier-metal nanoparticle composite prepared thereby, and has an advantage in that it is possible to improve dispersibility and supporting ratio of metal nanoparticles with respect to a carbon carrier by efficiently supporting metal nanoparticles having a uniform size of several nanometers on evenly dispersed carbon carriers.

16 Claims, 13 Drawing Sheets

(51) Int. Cl.
  *B22F 1/00* (2006.01)
  *C09C 1/56* (2006.01)
  *C01B 32/05* (2017.01)
  *C01B 32/152* (2017.01)
  *C01B 32/174* (2017.01)
  *C01B 32/194* (2017.01)

(52) U.S. Cl.
  CPC .......... *C01B 32/174* (2017.08); *C01B 32/194* (2017.08); *C09C 1/56* (2013.01); *C01P 2002/85* (2013.01); *C01P 2004/04* (2013.01); *C01P 2006/12* (2013.01); *C01P 2006/40* (2013.01)

(58) Field of Classification Search
  USPC ...................... 252/74; 502/184, 185; 556/112
  See application file for complete search history.

(56) References Cited

FOREIGN PATENT DOCUMENTS

| | | |
|---|---|---|
| JP | 2011236095 A | 11/2011 |
| KR | 10-2006-0092438 A | 8/2006 |
| KR | 10-2006-0134414 A | 12/2006 |
| KR | 10-0774590 B1 | 11/2007 |
| KR | 10-2008-0001678 A | 1/2008 |
| KR | 10-2010-0128178 A | 12/2010 |
| KR | 10-2012-0021385 A | 3/2012 |
| WO | 2008127396 A2 | 10/2008 |

OTHER PUBLICATIONS

Santosh et al., "Shape controlled synthesis of iron-cobalt alloy magnetic nanoparticles using soft template method," Materials Letters 64(10): 1127-1129 (2010).

[Figure 1]
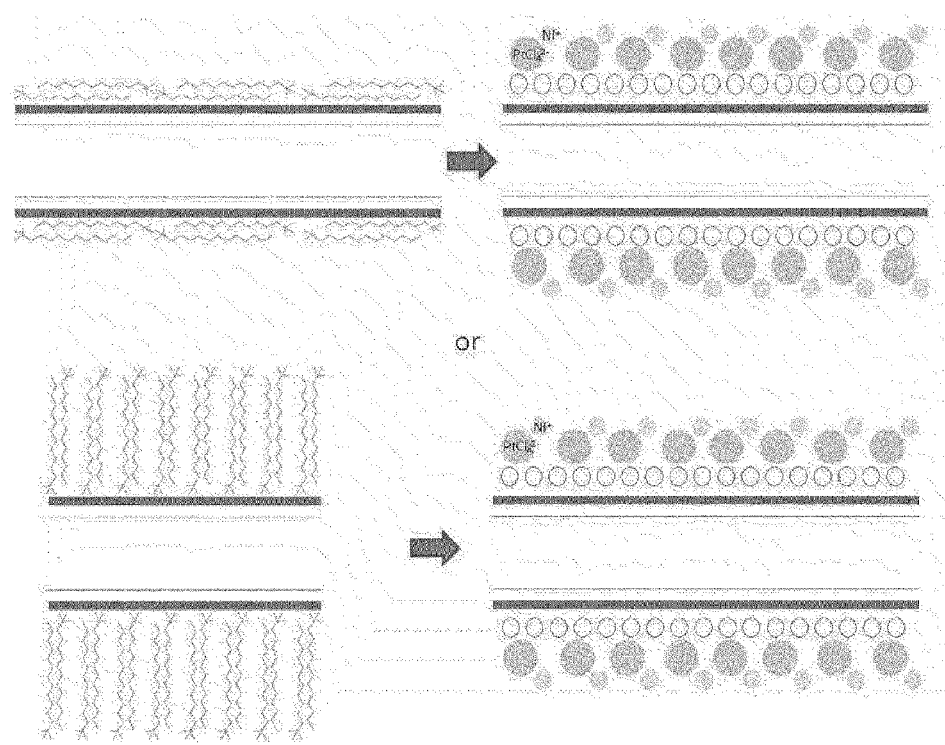

[Figure 2]
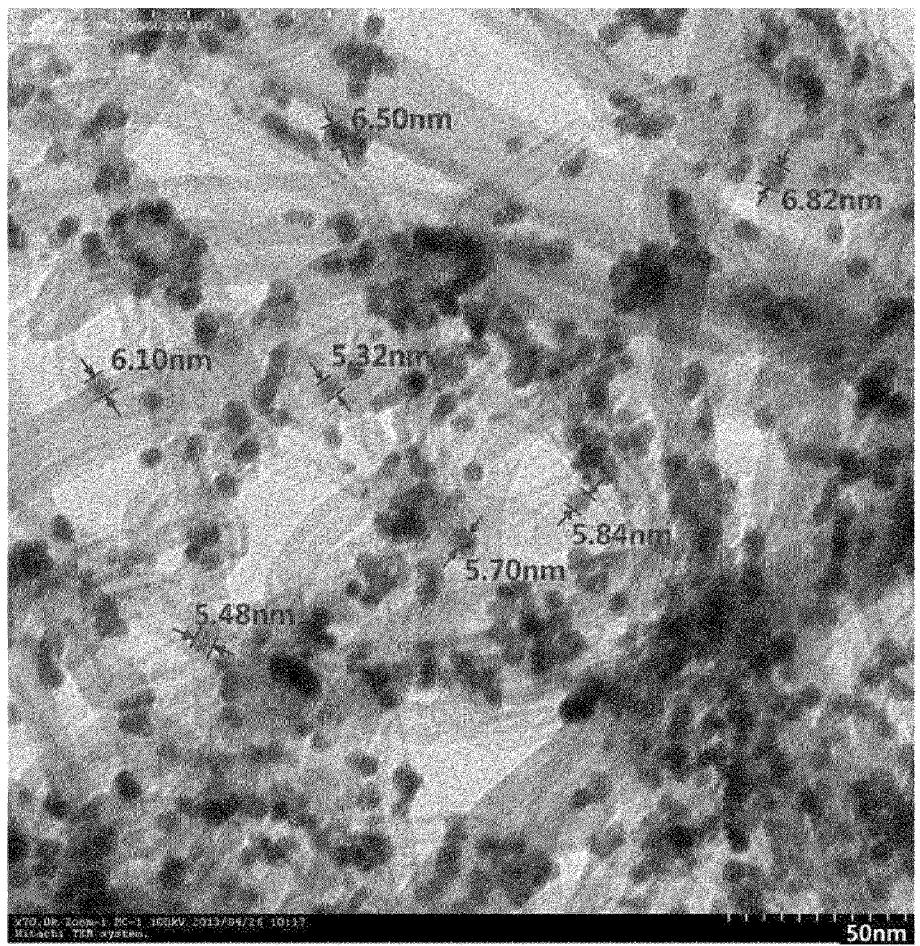

[Figure 3]
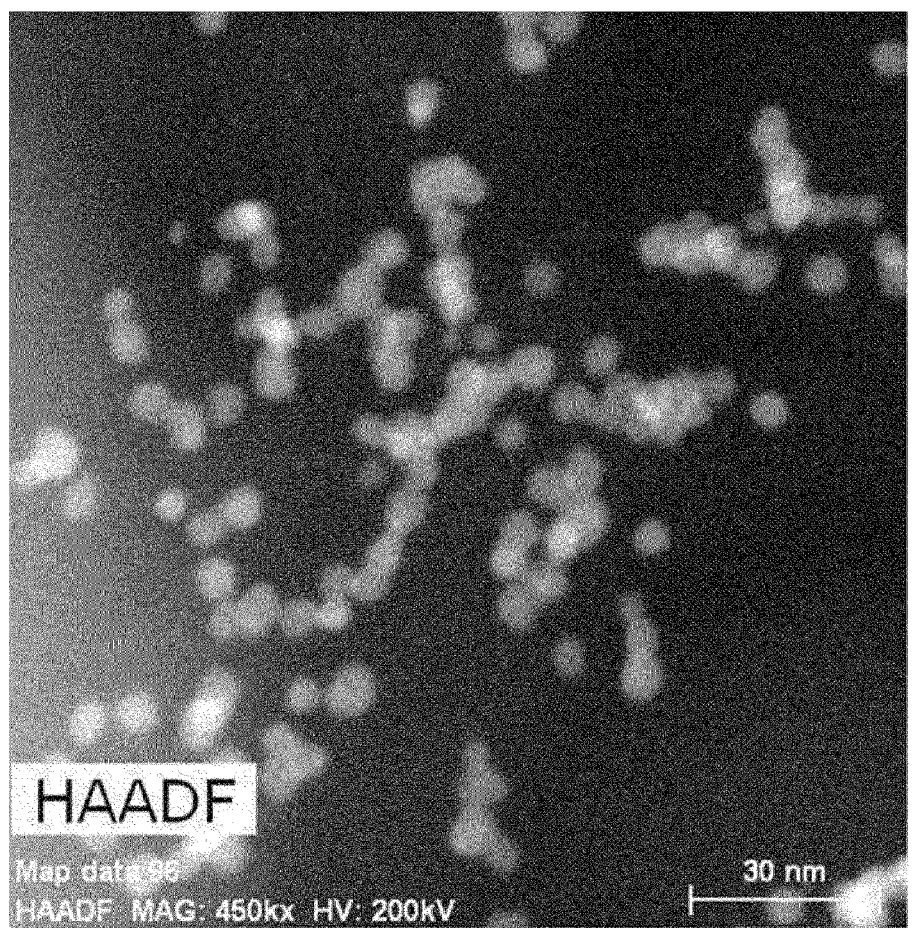

[Figure 4]
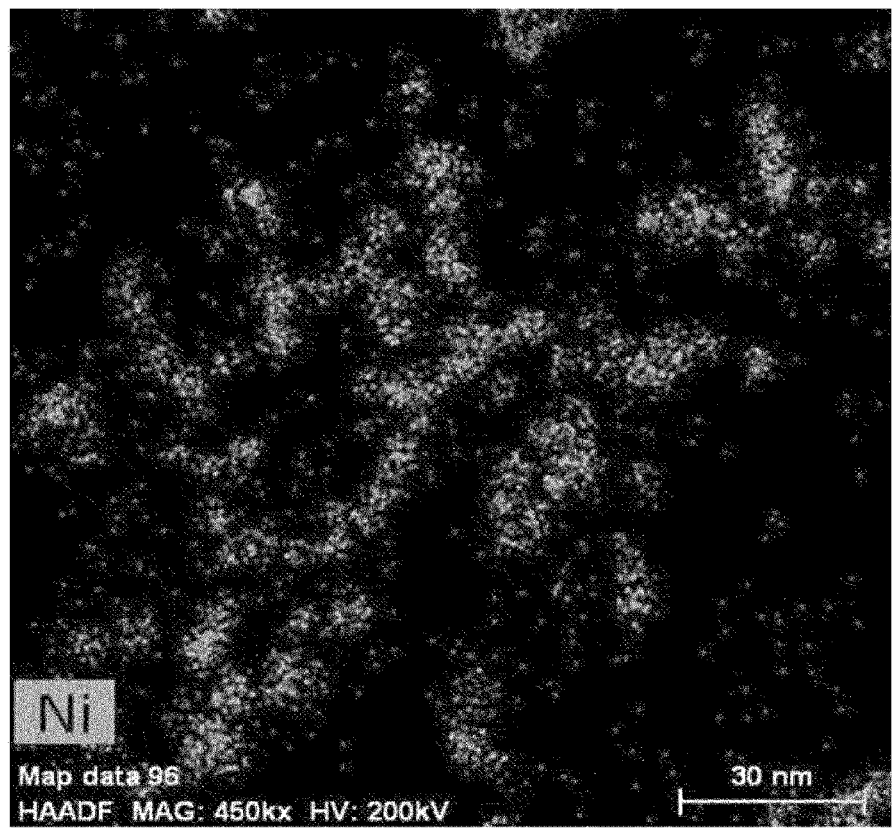

[Figure 5]
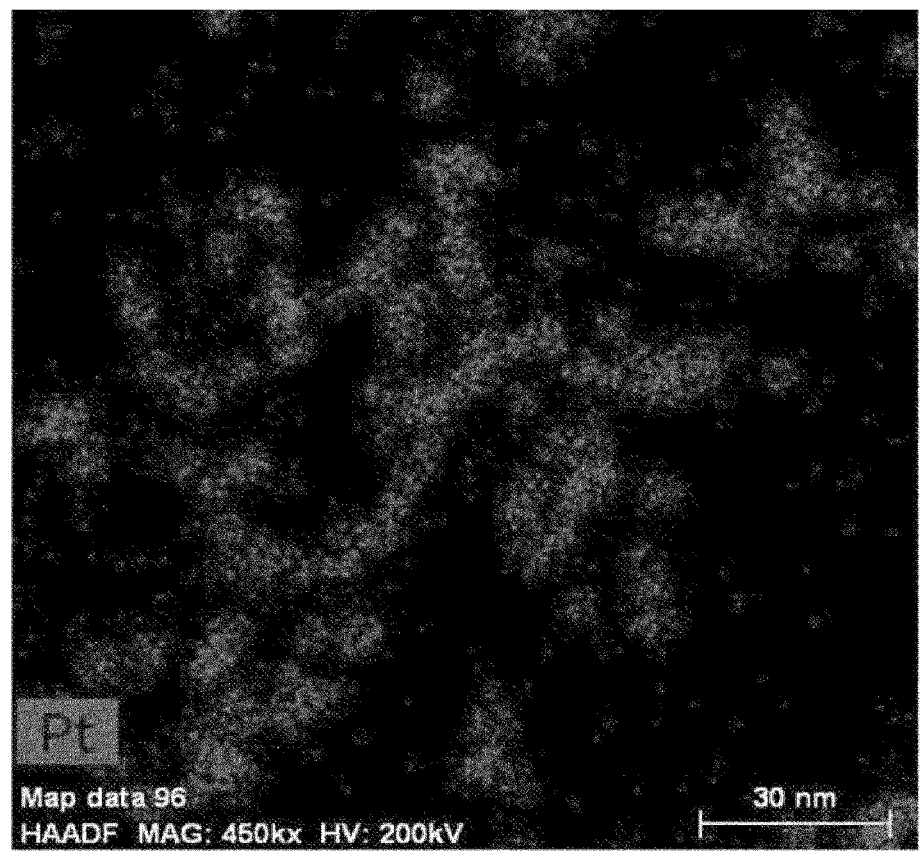

[Figure 6]
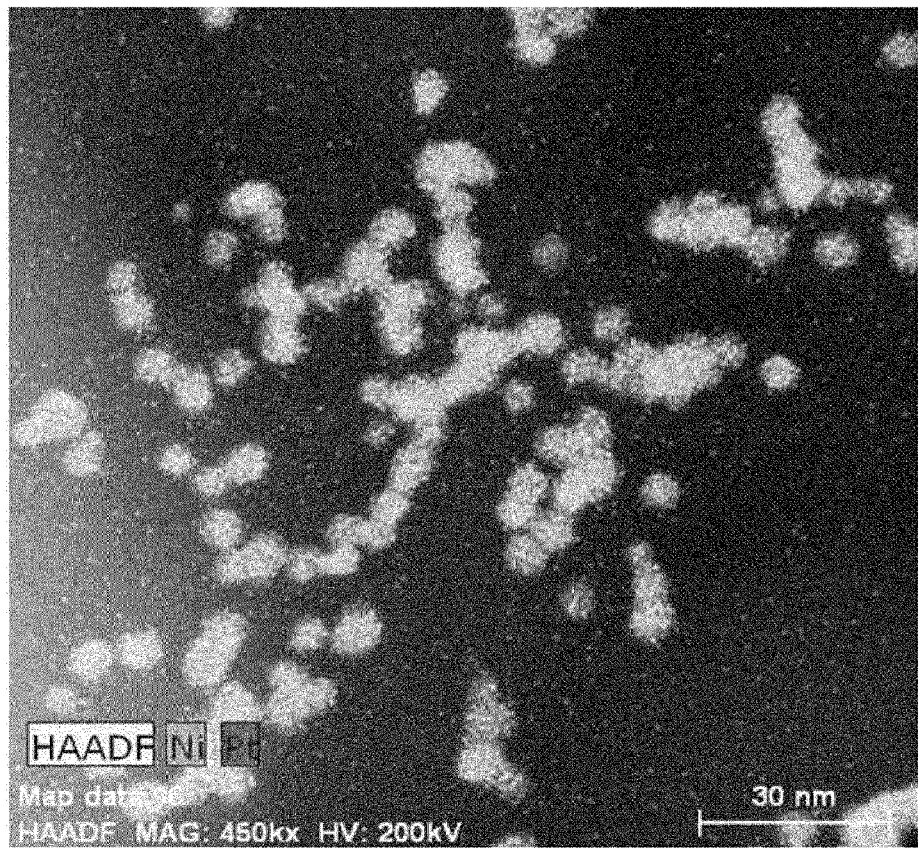
[Figure 7]
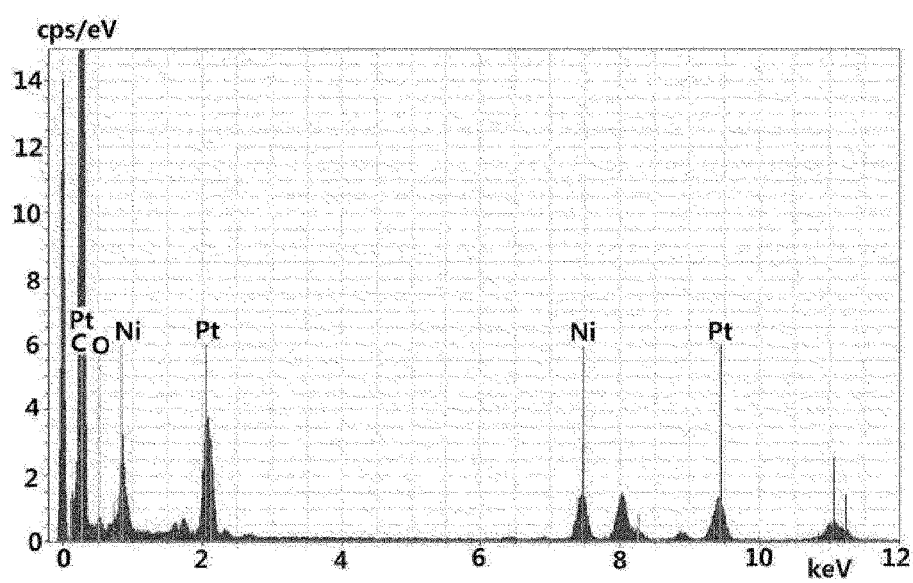

[Figure 8]
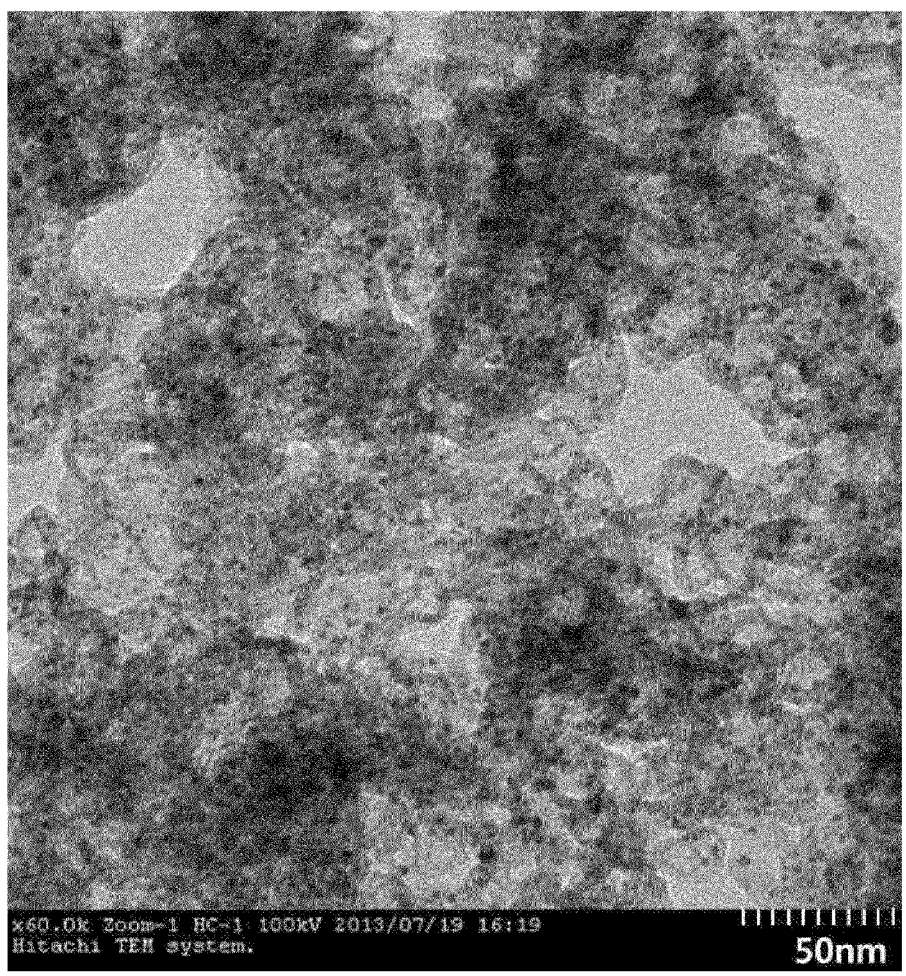

[Figure 9]
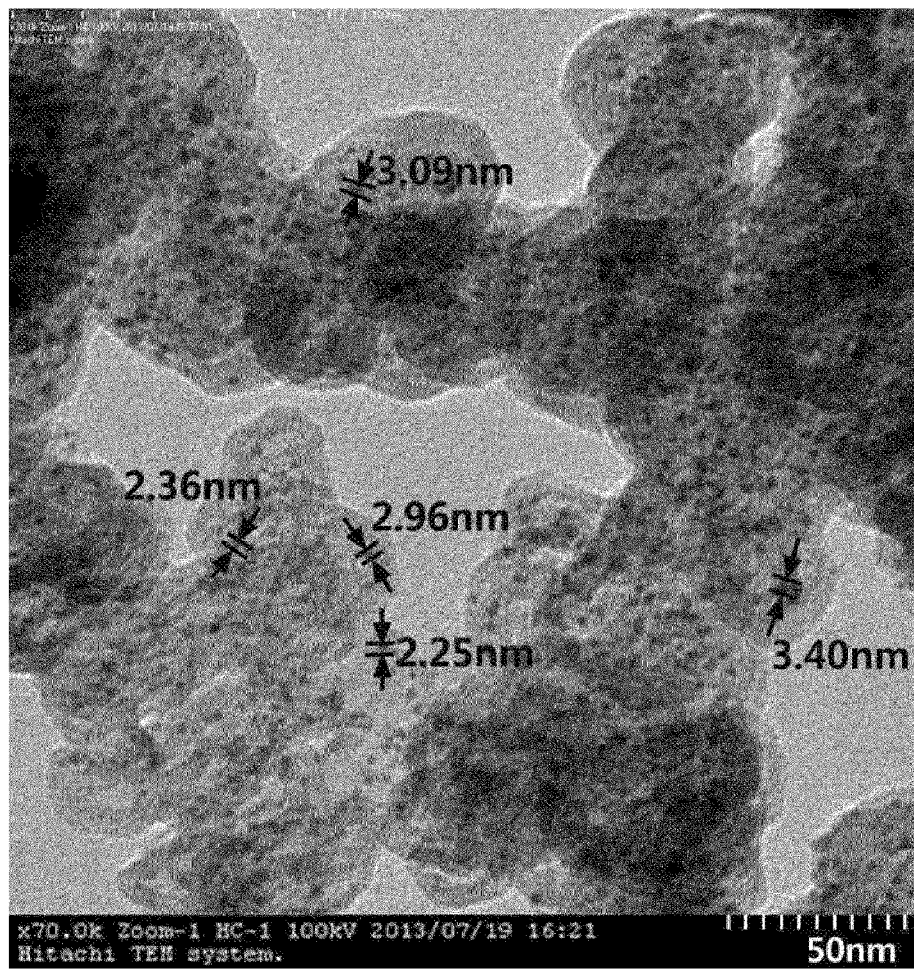

[Figure 10]
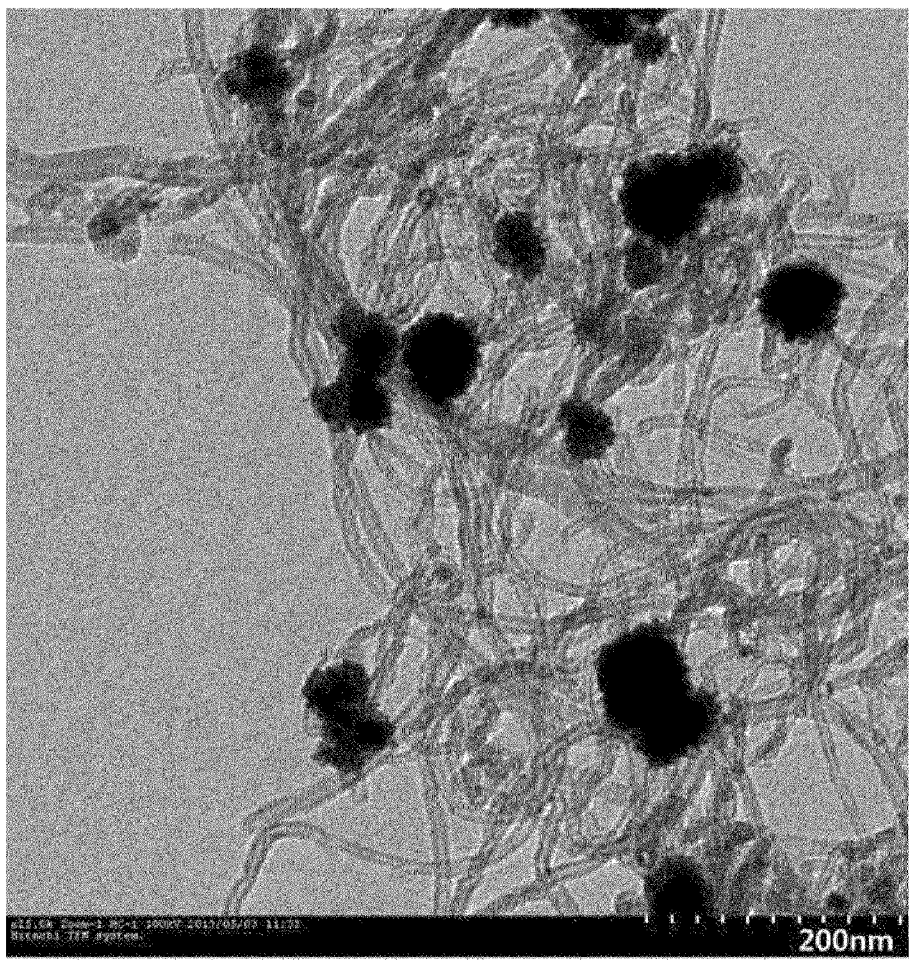

[Figure 11]
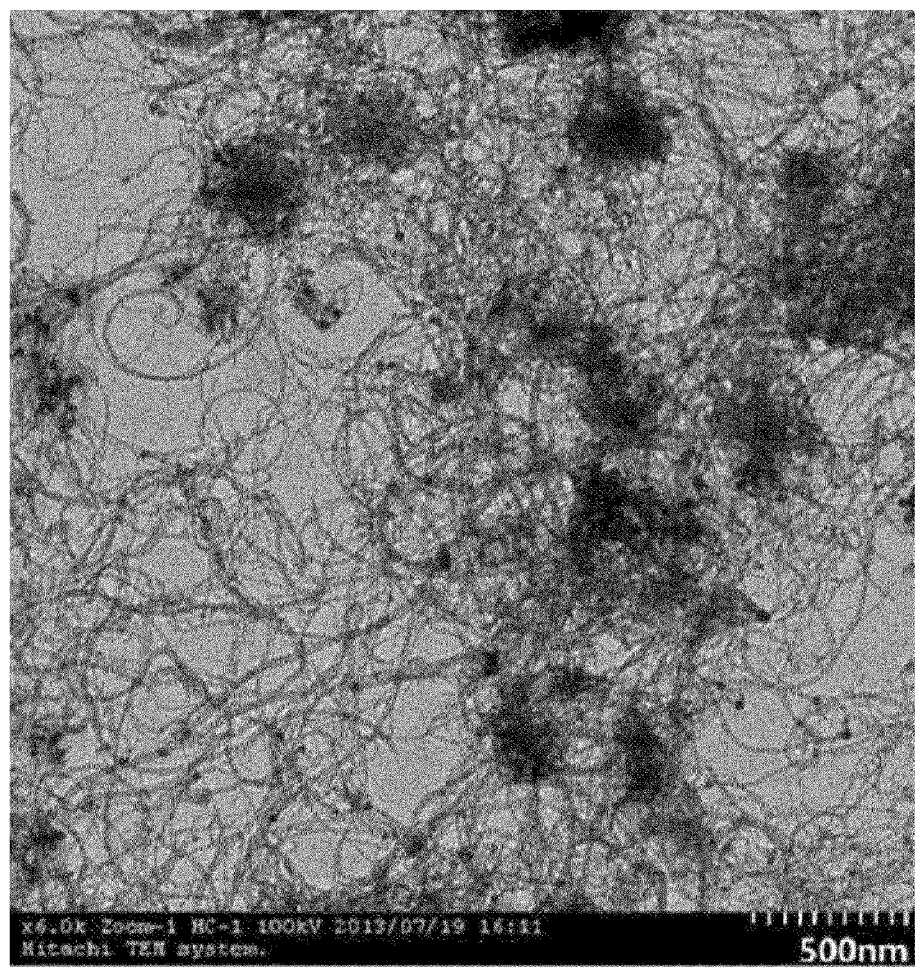

[Figure 12]
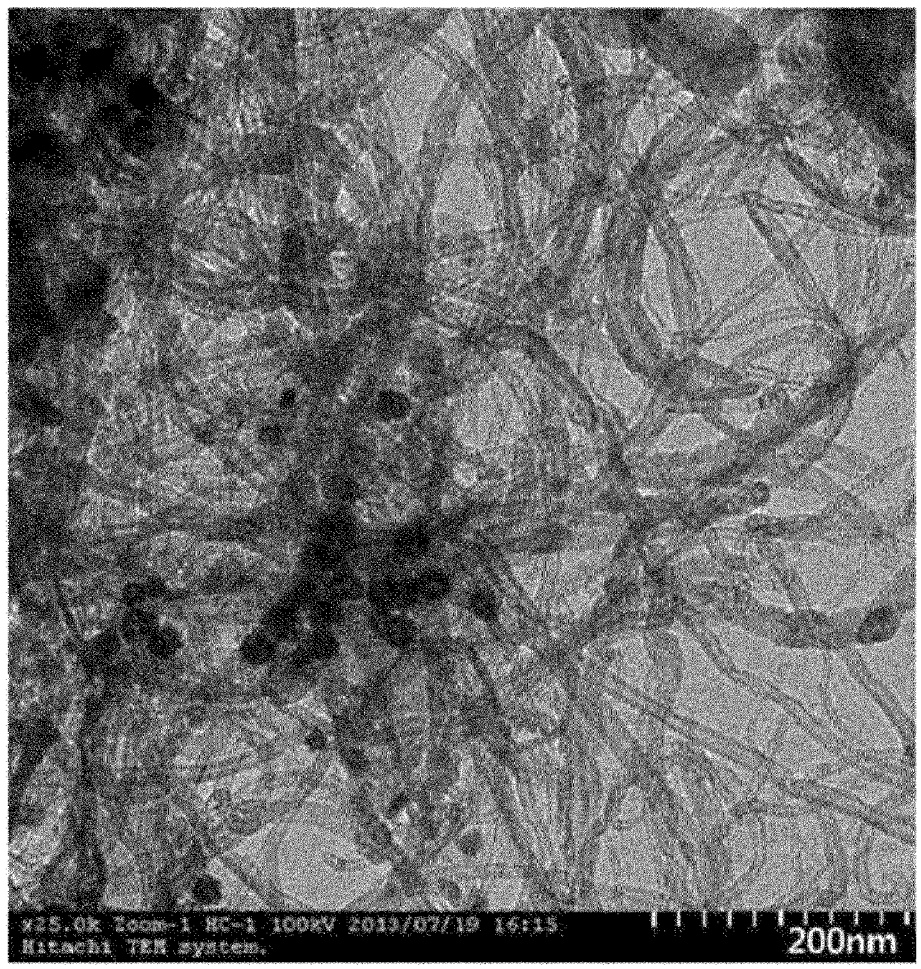

[Figure 13]
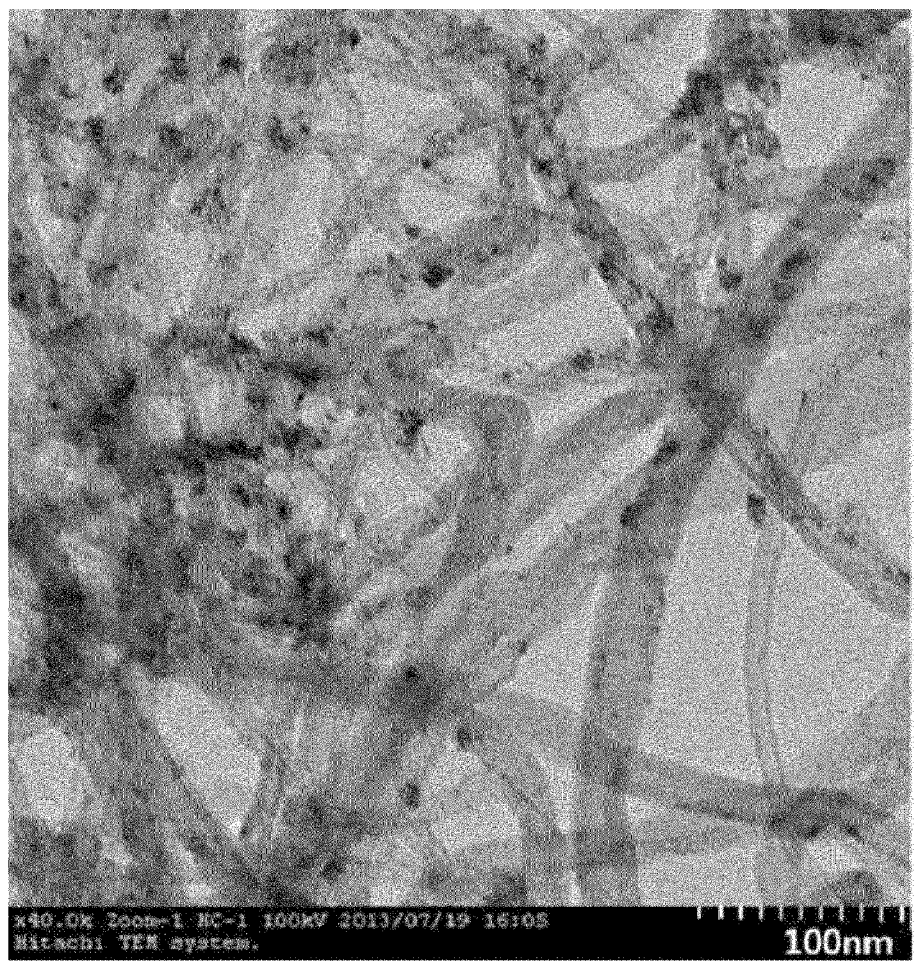

[Figure 14]
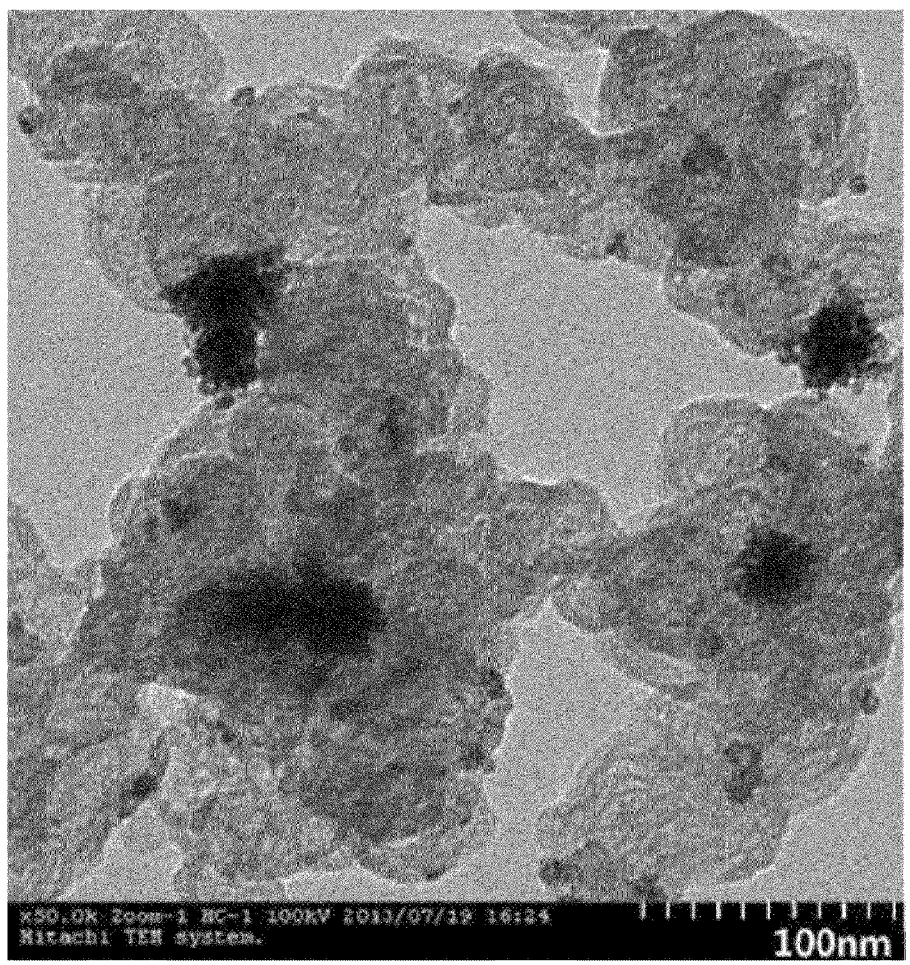

METHOD FOR MANUFACTURING CARBON CARRIER-METAL NANOPARTICLE COMPOSITE AND CARBON CARRIER-METAL NANOPARTICLE COMPOSITE MANUFACTURED THEREBY

TECHNICAL FIELD

This application is a National Stage Application of International Application No. PCT/KR2014/007059, filed Jul. 31, 2014, and claims priority to and the benefit of Korean Patent Application No. 10-2013-0091405, filed Aug. 1, 2013, the contents of which are incorporated by reference in their entirety for all purposes as if fully set forth below.

The present application relates to a method for manufacturing a carbon carrier-metal nanoparticle composite and a carbon carrier-metal nanoparticle composite prepared thereby.

BACKGROUND ART

Nanoparticles are particles having a particle size of the nanoscale, and show optical, electrical and magnetic properties completely different from those of bulk materials due to a large specific surface area and the quantum confinement effect, in which energy required for electron transfer changes depending on the size of material. Accordingly, due to such properties, much interest has been concentrated on their applicability in the catalytic, electromagnetic, optical, medical fields, and the like. The nanoparticles may be referred to as intermediates between bulks and molecules, and may be synthesized in terms of an approach in two directions, that is, the "top-down" approach and the "bottom-up" approach.

Examples of a method for synthesizing a metal nanoparticle include a method for reducing metal ions in a solution by using a reducing agent, a method for synthesizing a metal nanoparticle using gamma-rays, an electrochemical method, and the like, but in the existing methods, it is difficult to synthesize nanoparticles having a uniform size and shape, or it is difficult to economically mass-produce high-quality nanoparticles for various reasons such as problems of environmental contamination, high costs, and the like by using organic solvents.

Further, since the metal nanoparticles become easily unstable by heat treatment temperature and the reaction temperature, there are many cases where the metal nanoparticles are dispersed in a carrier and used. Therefore, there is a need for developing a method which may efficiently support metal nanoparticles on a carrier.

CITATION LIST

Korean Patent Application Laid-Open No. 10-2005-0098818

DETAILED DESCRIPTION OF THE INVENTION

Technical Problem

A problem to be solved by the present application is to provide a method for preparing a carbon carrier-metal nanoparticle composite, which may efficiently support nanoparticles having a uniform nanosize on a carbon carrier.

Further, another problem to be solved by the present application is to provide a carbon carrier-metal nanoparticle composite prepared by the manufacturing method.

The problems to be solved by the present application are not limited to the aforementioned technical problems, and other technical problems, which have not been mentioned, may be obviously understood by a person with ordinary skill in the art from the following description.

Technical Solution

An exemplary embodiment of the present application provides a method for preparing a carbon carrier-metal nanoparticle composite, the method including: forming a solution including a carbon carrier in which a hydrophilic functional group is induced on a surface of a carbon carrier by mixing the carbon carrier and a surfactant in a solvent; mixing a first metal salt and a second metal salt by adding the first metal salt and the second metal salt to the solution; and forming metal nanoparticles by adding a reducing agent to the solution.

Another exemplary embodiment of the present application provides a carbon carrier-metal nanoparticle composite prepared by the manufacturing method. Specifically, another exemplary embodiment of the present application provides a carbon carrier-metal nanoparticle composite including a carbon carrier in which a hydrophilic functional group is induced on the surface thereof and metal nanoparticles including two metals, in which the metal nanoparticles have an average particle diameter of 30 nm or less, and the metal nanoparticles are supported on the carbon carrier.

Advantageous Effects

When a manufacturing method according to an exemplary embodiment of the present application is used, there is an advantage in that it is possible to improve dispersibility and supporting ratio of metal nanoparticles having a uniform size with respect to a carbon carrier by efficiently supporting metal nanoparticles having a uniform size of several nanometers on evenly dispersed carbon carriers.

When the manufacturing method according to an exemplary embodiment of the present application is used, there is an advantage in that a carbon carrier has excellent corrosion resistance because the carbon carrier need not be subjected to a chemical pre-treatment such as an acid treatment. Specifically, when the manufacturing method according to an exemplary embodiment of the present application is used, the carbon carrier may minimize the loss in specific surface area and electrical conductivity, thereby exhibiting excellent performance.

BRIEF DESCRIPTION OF DRAWINGS

FIG. 1 illustrates an expected schematic view in which a carbon carrier-metal nanoparticle composite prepared according to Example 1 is produced.

FIG. 2 illustrates a transmission electron microscope (TEM) image of the carbon carrier-metal nanoparticle composite prepared according to Example 1.

FIG. 3 illustrates a high-angle annular dark field scanning transmission electron microscope (HAADF STEM) image of the carbon carrier-metal nanoparticle composite prepared according to Example 1.

FIG. 4 illustrates a HAADF STEM image of Ni in the carbon carrier-metal nanoparticle composite prepared according to Example 1.

FIG. 5 illustrates a HAADF STEM image of Pt in the carbon carrier-metal nanoparticle composite prepared according to Example 1.

FIG. 6 illustrates a HAADF STEM image of Ni and Pt in the carbon carrier-metal nanoparticle composite prepared according to Example 1.

FIG. 7 illustrates the analysis result obtained by an energy dispersive spectrometer (EDS) of the carbon carrier-metal nanoparticle composite prepared according to Example 1.

FIG. 8 illustrates a transmission electron microscope (TEM) image of a carbon carrier-metal nanoparticle composite prepared according to Example 2.

FIG. 9 is a magnification of the image of FIG. 8.

FIG. 10 illustrates a transmission electron microscope (TEM) image of a carbon carrier-metal nanoparticle composite prepared according to Comparative Example 1.

FIG. 11 illustrates a transmission electron microscope (TEM) image of a carbon carrier-metal nanoparticle composite prepared according to Comparative Example 2.

FIG. 12 is a magnification of FIG. 11.

FIG. 13 illustrates a transmission electron microscope (TEM) image of a carbon carrier-metal nanoparticle composite prepared according to Comparative Example 3.

FIG. 14 illustrates a transmission electron microscope (TEM) image of a carbon carrier-metal nanoparticle composite prepared according to Comparative Example 4.

BEST MODE

When one part "includes" one constituent element in the present specification, unless otherwise specifically described, this does not mean that another constituent element is excluded, but means that another constituent element may be further included.

Hereinafter, the present specification will be described in more detail.

An exemplary embodiment of the present application provides a method for preparing a carbon carrier-metal nanoparticle composite, the method including: forming a solution including a carbon carrier in which a hydrophilic functional group is induced on a surface of a carbon carrier by mixing the carbon carrier and a surfactant in a solvent (S10);

mixing a first metal salt and a second metal salt by adding the first metal salt and the second metal salt to the solution (S20); and forming metal nanoparticles by adding a reducing agent to the solution (S30).

In an exemplary embodiment of the present application, the surfactant serves to improve the dispersibility of the carbon carrier in the solution by preventing the carbon carrier from being aggregated, and to increase the supporting ratio of metal nanoparticles by inducing a hydrophilic functional group on a surface of the carbon carrier to facilitate the binding of the metal salt. Further, there is also an advantage in that the dispersibility of metal nanoparticles on the carbon carrier becomes excellent. The better the dispersibility is, the more active sites may participate in the reaction, and as a result, there is an effect of improving the reactivity. In addition, there is an advantage in that the durability may be improved because the interaction between metal nanoparticles and the carbon carrier is improved.

Furthermore, the manufacturing method according to an exemplary embodiment of the present application has an advantage in that the reduction potential between the first metal and the second metal is not considered because the reduction potential difference is not used. Since the charge between metal ions is used, the manufacturing method is simpler than the manufacturing methods in the related art, and thus there is an advantage in that the manufacturing method is easy for mass production.

In addition, the present inventors have found that there is a problem in that the surface treatment of crystalline carbon using an acid treatment damages the surface of crystalline carbon, and thus reduces corrosion resistance of crystalline carbon, and degrades the durability. Furthermore, the present inventors have found that an acid treatment method using a strong acid is advantageous in supporting a catalyst, but has an adverse effect of reducing the durability as a catalyst by increasing the corrosion of carbon, and invented the manufacturing method which may support nanoparticles without corrosion of carbon in order to overcome the adverse effect.

The forming of a solution including a carbon carrier in which a hydrophilic functional group is induced on a surface of a carbon carrier by mixing the carbon carrier and a surfactant in a solvent (S10) will be described as follows.

In an exemplary embodiment of the present application, the solvent may include water. Specifically, in an exemplary embodiment of the present application, the solvent may be water. Since the manufacturing method according to the present application does not use an organic solvent as the solvent, a post-treatment process of treating an organic solvent in the preparation process is not needed, and accordingly, there are effects of reducing costs and preventing environmental pollution.

In the manufacturing method according to an exemplary embodiment of the present application, in the forming of the solution, an ultrasonic wave may be applied before or after the carbon carrier is mixed with the surfactant. In this case, the time for applying the ultrasonic wave may be 30 seconds to 240 minutes, more specifically, 1 minute to minutes, 1 minute to 30 minutes, and 2 minutes to 5 minutes. Specifically, the carbon carrier and the surfactant may be mixed by putting the carbon carrier and the surfactant in the solvent, applying the ultrasonic wave thereto, and then stirring the resulting solution.

In an exemplary embodiment of the present application, the forming of the solution (S10) may be performed at a temperature in a range of 4° C. or more and less than 100° C. Specifically, the step may be performed at a temperature of 4° C. to 35° C. If an organic solvent is used as the solvent, there is a problem in that the preparation is performed at a high temperature more than 100° C., and thus, the costs in the process are increased. When the manufacturing method according to an exemplary embodiment of the present application is used, the manufacturing method is simple because the preparation may be performed at a low temperature less than 100° C., and accordingly, there are an advantage in the process and an obvious effect of reducing costs.

In an exemplary embodiment of the present application, the forming of the solution (S10) may be performed by stirring the solution for 5 minutes to 120 minutes, more specifically for 10 minutes to 90 minutes, and even more specifically for 20 minutes to 60 minutes. Further, an ultrasonic wave may be applied for 30 seconds to 240 minutes, more specifically, 1 minute to 60 minutes, 1 minute to 30 minutes, and 2 minutes to 5 minutes before or after the stirring.

In an exemplary embodiment of the present application, the content of the surfactant may be 1 to 40 times, specifically 1 to 30 times, and more specifically 1 to 20 times the weight of the carbon carrier. When the weight of the surfactant is less than the weight of the carbon carrier, the highly dispersed may not be achieved.

In an exemplary embodiment of the present application, the carbon carrier may be selected from the group consisting of carbon nanotube (CNT), graphite, graphene, activated carbon, mesoporous carbon, carbon black, carbon nano fiber, carbon nano wire, carbon nanohorn, carbon aerogel, carbon nano ring, fullerene (C60), and Super P.

Examples of the carbon black include Denka black, Ketjen black, or acetylene black.

The carbon nanotube may include one of SWCNT, DWCNT, MWCNT, functionalized SWCNT, functionalized DWCNT, functionalized MWCNT, purified SWCNT, purified DWCNT or purified MWCNT, or a mixture thereof. In the carbon nanotubes, the graphene sheet is rolled up without a seam, thereby forming the tube-like shape. The case where one tube is rolled up refers to a single walled carbon nanotube (SWCNT), the case where two tubes are rolled up refers to a double-walled carbon nanotube (DWCNT), and the case where two or more tubes are rolled up refers to a multi-walled carbon nanotube (MWCNT).

According to an exemplary embodiment of the present application, the carbon carrier may be a carbon carrier which is not subjected to pre-treatment. Specifically, according to an exemplary embodiment of the present specification, the carbon carrier has an advantage in that electrical conductivity is high and the specific surface area is wide because a carbon carrier, which is not subjected to a chemical pre-treatment such as an acid treatment, is used.

Specifically, for comparison of electrical conductivities and specific surface areas of the acid-treated hydrophobic carrier and the hydrophobic carrier of the present specification, which is not subjected to acid treatment, the results obtained by using Vulcan XC-72R and Ketjen 600JD to measure physical properties are shown in the following Table 1.

TABLE 1

|  | Electrical conductivity (S/cm) @ 1600 Kg | BET specific surface area ($m^2/g$) |
|---|---|---|
| Vulcan XC-72R which is not subjected to pre-treatment | 25.1 | 225 |
| Acid-treated Vulcan XC-72R | 7 | 160 |
| Ketjen 600JD which is not subjected to pre-treatment | 23 | 1400 |
| Acid-treated Ketjen 600JD | 5.5 | 650 |

As can be seen in Table 1, it can be seen that there is a significant difference in physical properties between the pre-treated carrier and the carrier which is not subjected to pre-treatment. Therefore, it is possible to infer excellent electrical conductivity and catalytic activity of nanoparticles supported on a hydrophobic carrier according to an exemplary embodiment of the present specification.

The electrical conductivity is a value measured via a resistance value of a powder to be measured, which is obtained by using a powder resistance apparatus under a pressure of 1,600 Kg.

The BET specific surface area was measured by an ASAP 2010 apparatus manufactured by Micromeritics Inc., and means a value calculated by performing the pre-treatment at 200° C. for 12 hours, and then setting the relative pressure to 0.05 to 3, and measuring 5 points.

According to an exemplary embodiment of the present application, the specific surface area of the carbon carrier may be 90% to 100% of a specific surface area of the carbon carrier before the hydrophilic functional group is induced.

According to an exemplary embodiment of the present application, the electrical conductivity of the carbon carrier may be 90% to 120% of the electrical conductivity of the carbon carrier before the hydrophilic functional group is induced.

In an exemplary embodiment of the present application, the surfactant may be a cationic surfactant or an anionic surfactant. Specifically, in an exemplary embodiment of the present application, the surfactant may be a cationic surfactant. In an exemplary embodiment of the present application, the hydrophilic functional group may be smoothly induced on the surface of the carbon carrier by a cationic surfactant rather than an anionic surfactant.

The surfactant is composed of a hydrophilic head group and a hydrophobic tail group, the tail groups are arranged along the surface of the carbon carrier, the head groups are arranged in the solution direction, and thus, the surface of the carbon carrier may be induced by the hydrophilic functional group. In this case, when a cationic surfactant is used, the hydrophilic head group exposed to the surface carries cations, and thus, atomic group ions which carry cations dissociated from a second metal salt are bonded, and in turn, metal ions which carry cations dissociated from a first metal salt are bonded.

In addition, when an anionic surfactant is used, the hydrophilic head group exposed to the surface carries cations, and thus, dissociated atomic group ions which carry cations at the first metal salt are bonded, and in turn, atomic group ions which carry cations dissociated from the first metal salt are bonded.

Accordingly, metal nanoparticles composed of an alloy of the first metal and the second metal may be effectively supported on a carbon carrier.

The cationic surfactant is a surfactant in which the head group carries cations, and may be specifically selected from the group consisting of dodecyltrimethylammonium bromide, quaternary ammonium compounds, benzalkonium chloride, cetyltrimethylammonium bromide, chitosans, lauryl dimethyl benzyl ammonium chloride, acyl carnitine hydrochlorides, alkyl pyridinium halides, cetyl pyridinium chloride, cationic lipids, polymethylmethacrylate trimethylammonium bromide, sulfonium compounds, polyvinylpyrrolidone-2-dimethylaminoethyl methacrylate dimethyl sulfate, hexadecyl trimethyl ammonium bromide, phosphonium compounds, quaternary ammonium compounds, benzyl-di(2-chloroethyl) ethyl ammonium bromide, coconut trimethyl ammonium chloride, coconut trimethyl ammonium bromide, coconut methyl dihydroxyethyl ammonium chloride, coconut methyl dihydroxyethyl ammonium bromide, decyl triethyl ammonium chloride, decyl dimethyl hydroxyethyl ammonium chloride, decyl dimethyl hydroxyethyl ammonium chloride bromide, ($C_{12-15}$)dimethyl hydroxyethyl ammonium chloride, ($C_{12-15}$)dimethyl hydroxyethyl ammonium chloride bromide, coconut dimethyl hydroxyethyl ammonium chloride, coconut dimethyl hydroxyethyl ammonium bromide, myristyl trimethyl ammonium methyl sulphate, lauryl dimethyl benzyl ammonium chloride, lauryl dimethyl benzyl ammonium bromide, lauryl dimethyl (ethenoxy)4 ammonium chloride, lauryl dimethyl (ethenoxy)4 ammonium bromide, N-alkyl ($C_{12-18}$) dimethylbenzyl ammonium chloride, N-alkyl ($C_{14-18}$)dimethyl-benzyl ammonium chloride, N-tetradecylidmethylbenzyl ammonium chloride monohydrate, dimethyl didecyl ammonium chloride, trimethylammonium halide alkyl-trimethylammonium salts, dialkyl-dimethylammonium salts, lauryl trimethyl ammonium chloride, ethoxylated alkyl amido alkyl dialkyl ammonium salts, ethoxylated trialkyl ammonium salts, dialkylbenzene dialkylammonium chloride, N-didecyldimethyl ammonium chloride, N-tetradecyldimethylbenzyl ammonium chloride monohydrate, N-alkyl($C_{12-14}$)dimethyl 1-naphthylmethyl ammonium chloride, dodecyldimethylbenzyl ammonium chloride, dialkyl benzenealkyl ammonium chloride, lauryl trimethyl ammonium chloride, alkylbenzyl methyl ammonium chloride, alkyl benzyl dimethyl ammonium bromide, $C_{12}$ trimethyl ammonium bromide, $C_{15}$ trimethyl ammonium bromide, $C_{17}$ trimethyl ammonium bromide, dodecylbenzyl triethyl ammonium chloride, polydiallyldimethylammonium chloride, dimethyl ammonium chlorides, alkyldimethylammonium halogenides, tricetyl methyl ammonium chloride, decyltrimethylammonium bromide, dodecyltriethylammonium bromide, tetradecyltrimethylammonium bromide, methyl trioctylammonium chloride, POLYQUAT 10, tetrabutylammonium bromide, benzyl trimethylammonium bromide, choline esters, benzalkonium chloride, stearalkonium chloride, cetyl pyridinium bromide, cetyl pyridinium chloride, halide salts of quaternized polyoxyethylalkylamines, MIRAPOL, Alkaquat, alkyl pyridinium salts, amines, amine salts, imide azolinium salts, protonated quaternary acrylamides, methylated quaternary polymers, cationic guar gum, benzalkonium chloride, triethanolamine, and poloxamines.

The anionic surfactant is a surfactant in which the head group carries anions, and specifically, may be one selected from the group consisting of potassium laurate, triethanolamine stearate, sodium lauryl sulfate, sodium dodecylsulfate, alkyl polyoxyethylene sulfate, sodium alginate, dioctyl sodium sulfosuccinate, phosphatidyl glycerol, phosphatidyl inositol, phosphatidylserine, phosphatidic acid and salts thereof, glyceryl esters, sodium carboxymethylcellulose, bile acids and salts thereof, cholic acid, deoxycholic acid, glycocholic acid, taurocholic acid, glycodeoxycholic acid, alkyl sulfonate, aryl sulfonate, alkyl phosphate, alkyl phosphonate, stearic acid and salts thereof, calcium stearate, phosphate, carboxymethylcellulose sodium, dioctyl sulfosuccinate, dialkyl esters of sodium sulfosuccinate, phospholipids, and calcium carboxymethylcellulose.

In an exemplary embodiment of the present application, the mixing of a first metal salt and a second metal salt by adding the first metal salt and the second metal salt to the solution (S20) will be described as follows.

In an exemplary embodiment of the present application, the first metal salt or the second metal salt is not particularly limited as long as the first metal salt or the second metal salt may be ionized in the solution to provide metal ions. The first metal salt may include the first metal, and the second metal salt may include the second metal. Here, the first metal and the second metal may be different from each other.

In an exemplary embodiment of the present application, the first metal or the second metal may be selected from the group consisting of metals belonging to Groups 3 to 15 of the periodic table, metalloids, lanthanide metals, and actinide metals, and specifically, may be one selected from the group consisting of platinum (Pt), ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), gold (Au), cerium (Ce), silver (Ag), and copper (Cu).

In an exemplary embodiment of the present application, the first metal salt may be represented by the following Chemical Formula 1, and may provide a cation of a metal.

$$XAm \qquad \text{[Chemical Formula 1]}$$

Further, the second metal salt may be represented by the following Chemical Formula 2, and may provide anions of an atomic group including metals.

$$BpYCq \qquad \text{[Chemical Formula 2]}$$

In Chemical Formula 1 or Chemical Formula 2, X and Y may be each independently an ion of a metal selected from the group consisting of metals belonging to Groups 3 to 15 of the periodic table, metalloids, lanthanide metals, and actinide metals.

In Chemical Formula 1, X may be specifically an ion of a metal selected from the group consisting of platinum (Pt), ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), gold (Au), cerium (Ce), silver (Ag), and copper (Cu), more specifically, may be an ion of a metal selected from the group consisting of ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), cerium (Ce), and copper (Cu), and even more specifically, may be an ion of nickel (Ni).

In Chemical Formula 2, Y is different from X, may be an ion of a metal selected from the group consisting of platinum (Pt), ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), gold (Au), cerium (Ce), silver (Ag), and copper (Cu), more specifically, may be an ion of a metal selected from the group consisting of platinum (Pt), gold (Au), silver (Ag), and palladium (Pd), and even more specifically, may be an ion of platinum (Pt).

In Chemical Formula 1 or Chemical Formula 2, A and C are each independently a ligand which is a monovalent anion, and specifically, may be each independently a ligand selected from the group consisting of $NO_3^-$, $NO_2^-$, $OH^-$, $F^-$, $Cl^-$, $Br^-$, and $I^-$.

In Chemical Formula 2, B may be an ion of an element belonging to Group 1 of the periodic table, and specifically, may be an ion selected from the group consisting of $K^+$, $Na^+$, and $NH_3^+$.

In Chemical Formula 1 or Chemical Formula 2, m may be 2 or 3, p may be 0, 2, or 4, and q may be 2, 4, or 6.

The first metal salt may be specifically $NiCl_2$ or $Ni(NO_3)_2$, and the second metal salt may be specifically $K_2PtCl_4$ or $K_2PtCl_6$.

For example, the first metal salt may provide a cation of $Ni^{2+}$, and the second metal salt may provide an anion of $PtCl_4^{2-}$. When a cationic surfactant is used, the hydrophobic tails of the cationic surfactant are arranged in the surface direction of the carbon carrier, the hydrophilic heads thereof which carry cations in the solution direction are arranged, and an anion of $PtCl_4^{2-}$ may be positioned on the surface of the carbon carrier, a cation of $Ni^{2+}$ is positioned at the outside thereof, and thus, metal nanoparticles in the form of an alloy of Ni and Pt may be supported on the carbon carrier.

As another example, when an anionic surfactant is used, the hydrophobic tails of the anionic surfactant are arranged in the surface direction of the carbon carrier, the hydrophilic heads thereof which carry anions in the solution direction are arranged, and a cation of $Ni^{2+}$ may be positioned on the surface of the carbon carrier, an anion of $PtCl_4^{2-}$ is positioned at the outside thereof, and thus, metal nanoparticles in the form of an alloy of Ni and Pt may be supported on the carbon carrier.

In an exemplary embodiment of the present application, the molar ratio of the first metal salt and the second metal salt may be 1:5 to 10:1, specifically, 2:1 to 5:1. In the aforementioned range, it is preferred to form metal nanoparticles.

In the manufacturing method according to an exemplary embodiment of the present application, in the mixing (S20), a stabilizer may be further added.

In an exemplary embodiment of the present application, the stabilizer may include one or two or more selected from the group consisting of disodium phosphate, dipotassium phosphate, disodium citrate, and trisodium citrate.

When a stabilizer is not used, particles are aggregated with each other, and thus may not be uniformly supported, and when a stabilizer is used, there is an advantage in that particles are uniformly dispersed, and thus may be well supported, and may be formed in the form of a sphere.

The content of the stabilizer may be two times to ten times the molar concentration of the first metal salt and the second metal salt.

In the manufacturing method according to an exemplary embodiment of the present application, the mixing (S20) may be performed at a temperature in a range of 4° C. or more and less than 100° C. Specifically, the step may be performed at a temperature of 4° C. to 35° C.

In the manufacturing method according to an exemplary embodiment of the present application, the mixing (S20) may be performed by stirring the solution for 5 minutes to 120 minutes, more specifically for 10 minutes to 90 minutes, and even more specifically for 20 minutes to 60 minutes.

The manufacturing method of the present application has an advantage in that the metal salts are uniformly dispersed because the first metal salt and the second metal salt are dispersed in the carbon carrier before metal nanoparticles are formed. Thus, particles are less aggregated when metal nanoparticles are formed. In addition, there is an advantage in that adhesion strength or bonding strength of metal nanoparticles to the carbon carrier is improved.

In an exemplary embodiment of the present application, the forming of metal nanoparticles by adding a reducing agent to the solution (S30) will be described as follows.

The metal nanoparticle may be an alloy of the first metal and the second metal. The metal nanoparticle is a metal nanoparticle composed of an alloy of two metals, and thus, has an advantage in that metal particles are uniformly dispersed in the form of a uniform spherical nanoparticle as compared to metal nanoparticles composed of one single metal. In addition, when used as a catalyst of a fuel cell, the particles composed of an alloy are excellent in terms of durability as compared to the particles of a single metal. In this case, the metal particle may have better characteristics in terms of sintering.

In the manufacturing method according to an exemplary embodiment of the present application, the forming of metal nanoparticles by adding a reducing agent to the solution (S30) may be performed at a temperature in a range of 4° C. or more and less than 100° C. Specifically, the step may be performed at a temperature of 4° C. to 35° C. Since the preparation may be carried out at a temperature less than 100° C., the present application is advantageous in terms of process due to a simple manufacturing method, and has a significant effect of reducing costs.

In the manufacturing method according to an exemplary embodiment of the present application, the forming of the metal nanoparticle (S30) may be performed by reacting the solution with the reducing agent for a predetermined time, specifically for 5 minutes to 120 minutes, more specifically for 10 minutes to 90 minutes, and even more specifically for 20 minutes to 60 minutes.

In an exemplary embodiment of the present application, the reducing agent is not particularly limited as long as the reducing agent is a strong reducing agent having a standard reduction potential of −0.23 V or less, specifically of −4 V to −0.23 V, and has a reducing power which may reduce the dissolved metal ions to be precipitated as metal particles.

The reducing agent may be, for example, one or two or more selected from the group consisting of $NaBH_4$, $NH_2NH_2$, $LiAlH_4$, and $LiBEt_3H$.

When a weak reducing agent is used, a reaction speed is slow and a subsequent heating of the solution is required, so that it is difficult to achieve a continuous process, and thus, there may be a problem in terms of mass production, and particularly, when ethylene glycol, which is one of the weak reducing agents, is used, there is a problem in that the productivity is low in a continuous process due to a decrease in flow rate caused by high viscosity.

The metal nanoparticles prepared according to an exemplary embodiment of the present application may have a spherical shape. In this case, the metal nanoparticles may have an average particle diameter of 30 nm or less, 20 nm or less, 10 nm or less, and 6 nm or less. Furthermore, the average particle diameter may be 1 nm or more. It may be difficult to form metal nanoparticles having an average particle diameter less than 1 nm. In addition, when the metal nanoparticles have a particle diameter of 30 nm or less, there is a big advantage in that nanoparticles may be used in various fields. Furthermore, the case where the metal nanoparticles have a particle diameter of 20 nm or less, 10 nm or less, and 6 nm or less is more preferred. When the metal nanoparticles formed are used as, for example, a catalyst of a fuel cell, the efficiency of the fuel cell may be significantly increased.

The metal nanoparticles prepared according to an exemplary embodiment of the present application may be formed in a uniform size. The CV value of metal nanoparticles supported on the carbon carrier may be 30% or less, more specifically 20% or less, and even more specifically 14% or less. The CV value may be represented by the following Equation 1. The smaller CV value means that particles are uniform.

$$CV(\%) = \frac{\text{Standard deviation of particles}}{\text{Average particle diameter}} \times 100. \quad \text{[Equation 1]}$$

In the carbon carrier-metal nanoparticle composite prepared according to an exemplary embodiment of the present application, the supporting ratio of metal nanoparticles with respect to a carbon carrier may be 10 wt % to 70 wt %.

In the carbon carrier-metal nanoparticle composite prepared by the manufacturing method according to an exemplary embodiment of the present application, the metal nanoparticles may include 80% or more and 90% or more of particles in which the distance between two adjacent particles among the metal nanoparticles supported on the carbon carrier is 10 times or less the particle diameter. The larger number of particles in which the distance between two adjacent particles among the metal nanoparticles supported on the carbon carrier is 10 times or less the particle diameter means that the metal nanoparticles are dispersed well.

According to an exemplary embodiment of the present application, it is possible to prepare a carbon carrier-metal nanoparticle composite in which metal nanoparticles having a few uniform sizes are efficiently supported on a carbon carrier. By methods in the related art, it was difficult to prepare several nanometer-sized metal nanoparticles, it was more difficult to prepare uniform-sized metal nanoparticles, and the supporting ratio and dispersibility were not good. However, according to the manufacturing method of the present application, there is an advantage in that uniform metal nanoparticles having a size of several nanometers are supported on a carbon carrier by a simple method, and thus it is possible to improve the supporting ratio and the dispersibility.

An exemplary embodiment of the present application provides a carbon carrier-metal nanoparticle composite prepared by the manufacturing method. Specifically, another exemplary embodiment of the present application provides a carbon carrier-metal nanoparticle composite including a carbon carrier in which a hydrophilic functional group is induced on the surface thereof and metal nanoparticles including two metals, in which the metal nanoparticles have an average particle diameter of 30 nm or less, and the metal nanoparticles are supported on the carbon carrier.

According to an exemplary embodiment of the present application, the specific surface area of the carbon carrier may be 90% to 100% of a specific surface area of the carbon carrier before the hydrophilic functional group is induced.

According to an exemplary embodiment of the present application, the electrical conductivity of the carbon carrier may be 90% to 120% of the electrical conductivity of the carbon carrier before the hydrophilic functional group is induced.

The description on the carbon carrier or the metal nanoparticles in the carbon carrier-metal nanoparticle composite is the same as described above.

The carbon carrier-metal nanoparticle composite prepared by the manufacturing method according to an exemplary embodiment of the present application may be used in substitution for the existing nanoparticles in the field where nanoparticles may be generally used. The metal nanoparticles in the carbon carrier-metal nanoparticle composite have much smaller sizes and wider specific surface areas than the nanoparticles in the related art, and thus may exhibit better activity than the nanoparticles in the related art. Specifically, the carbon carrier-metal nanoparticle composite prepared according to the manufacturing method according to an exemplary embodiment of the present application may be used in various fields such as the catalyst, the drug delivery, and the gas sensor. The catalyst may be specifically used as a catalyst of a fuel cell. Further, the metal nanoparticles may also be used as an active material formulation in cosmetics, pesticides, animal nutrients, or food supplements, and may also be used as a pigment in electronic products, optical elements, or polymers.

MODE FOR INVENTION

Hereinafter, the present invention will be described in detail with reference to the Examples and Comparative Examples for specifically describing the present invention. However, the Examples according to the present invention may be modified in various forms, and it is not interpreted that the scope of the present invention is limited to the Examples to be described in detail below. The Examples of the present invention are provided for more completely explaining the present invention to the person with ordinary skill in the art.

Example 1

350 mg of dodecyl trimethylammonium bromide (DTAB) as a surfactant and 15 mg of raw MWCNT were put into 40 ml of water and treated in an ultrasonic wave bath for 5 minutes, and the resulting mixture was stirred for 30 minutes. Thereafter, 0.06 mmol of $Ni(Cl)_2$ as a first metal salt, 0.02 mmol of $K_2PtCl_4$ as a second metal salt, and 0.2 mmol of trisodium citrate as a stabilizer were added thereto, and the resulting mixture was stirred for 30 minutes. In this case, the molar ratio of $Ni(Cl)_2$ and $K_2PtCl_4$ was 3:1.

Subsequently, 0.5 mmol of $NaBH_4$ as a reducing agent was added to the solution at a rate of 200 ml/h, and the resulting mixture was reacted for 30 minutes. The resulting product was centrifuged at 10,000 rpm for 10 minutes, the supernatant in the upper layer was discarded, the remaining precipitate was re-dispersed in 20 ml of water, and then the centrifugation process was repeated once more, thereby preparing a carbon carrier-metal nanoparticle composite in which metal nanoparticles, which are an alloy of Ni and Pt, are supported in MWCNT. In this case, it could be confirmed that the supporting ratio was 27 wt % because in an energy dispersive spectrometer (EDS) mapping analysis, the weight of the carbon carrier was 73 wt % and the weight of metal nanoparticles, which are an alloy of NI and Pt, was 27 wt %.

FIG. 1 illustrates an expected schematic view in which a carbon carrier-metal nanoparticle composite prepared according to Example 1 is produced.

FIG. 2 illustrates a transmission electron microscope (TEM) image of the carbon carrier-metal nanoparticle composite prepared according to Example 1. The particle diameters of metal nanoparticles obtained by the Scherrer equation calculation method for the HR-TEM in FIG. 2 were 6.50 nm, 6.82 nm, 6.10 nm, 5.32 nm, 5.84 nm, 5.70 nm, and 5.48 nm from the above, and thus the average value was approximately 6 nm. Further, referring to FIG. 2, it could be confirmed that 90% or more of the metal nanoparticles supported on the carbon carrier were uniformly dispersed because the distance between two adjacent particles was 10 times or less the particle diameter.

The average particle diameter of metal nanoparticles formed was measured for 200 or more metal nanoparticles by using a graphic software (MAC-View) based on FIG. 2. It could be confirmed that the metal nanoparticles were prepared in a very uniform size because the average particle diameter was 6 nm, the standard deviation was 0.47 nm, and the CV value was 7.8% through the statistical distribution obtained.

FIG. 3 illustrates a high-angle annular dark field scanning transmission electron microscope (HAADF STEM) image of the carbon carrier-metal nanoparticle composite prepared according to Example 1, and in this case, FIG. 4 illustrates Ni, FIG. 5 illustrates Pt, and FIG. 6 illustrates both Ni and Pt.

FIG. 7 illustrates the mapping analysis result obtained by an energy dispersive spectrometer (EDS) of the carbon carrier-metal nanoparticle composite prepared according to Example 1.

The following Table 2 shows each element in wt % and atomic percentage %.

TABLE 2

| Element | [norm, wt. %] | [norm, at. %] |
|---|---|---|
| Carbon | 73.13769747 | 96.52139422 |
| Oxygen | 0.138559305 | 0.137275647 |
| Platinum | 20.52765957 | 1.667969758 |
| Nickel | 6.196083653 | 1.673360374 |
| | 100 | 100 |

Example 2

A carbon carrier-metal nanoparticle composite was prepared by using the same method as in Example 1, except that 15 mg of Ketjen black carbon was used instead of raw MWCNT as the carbon carrier in Example 1.

FIG. 8 illustrates a transmission electron microscope (TEM) image of a carbon carrier-metal nanoparticle composite prepared according to Example 2. Referring to FIG. 8, it can be confirmed that the carbon carrier is well dispersed, and spherical metal nanoparticles having a uniform size are formed, and thus are well dispersed on the carbon carrier. FIG. 9 is a magnification of FIG. 8, and it could be confirmed that the particle diameters of metal nanoparticles obtained by the Scherrer equation calculation method for the HR-TEM in FIG. 9 were 3.09 nm, 2.36 nm, 2.96 nm, 3.40 nm, and 2.25 nm from above, and nanoparticles having an average particle diameter of 2.89 nm were formed. Further, in this case, the standard deviation was 0.39 nm and the CV value was 13.5%, and thus, it could be confirmed that the particles were prepared in a very uniform size.

Further, referring to FIG. 9, it could be confirmed that 90% or more of the metal nanoparticles supported on the carbon carrier were uniformly dispersed because the distance between two adjacent particles was 10 times or less the particle diameter.

Comparative Example 1

A carbon carrier-metal nanoparticle composite was prepared by using the same method as in Example 1, except that the surfactant was not used.

FIG. 10 illustrates a transmission electron microscope (TEM) image of a carbon carrier-metal nanoparticle composite prepared according to Comparative Example 1. Referring to FIG. 10, it could be confirmed that metal nanoparticles were not well formed and metal particles were aggregated, and that the carbon carrier was also not well dispersed and was aggregated.

Comparative Example 2

A carbon carrier-metal nanoparticle composite was prepared by using the same method as in Example 1, except that the stabilizer was not used. FIG. 11 illustrates a transmission electron microscope (TEM) image of a carbon carrier-metal nanoparticle composite prepared according to Comparative Example 2, and FIG. 12 is a magnification of FIG. 11. Referring to FIGS. 11 and 12, it could be confirmed that metal nanoparticles were not well dispersed on the carbon carrier and were aggregated and formed, and that the carbon carrier was not well dispersed and was aggregated. In addition, it could be confirmed that most of the metal nanoparticles supported on the carbon carrier were not well dispersed because the metal nanoparticles were distributed while the distance between two adjacent particles is more than 10 times the particle diameter.

Comparative Example 3

A carbon carrier-single metal nanoparticle composite was prepared by using the same method as in Example 1, except that only 0.02 mmol of $K_2PtCl_4$ was used as the metal salt. FIG. 13 illustrates a transmission electron microscope (TEM) image of a carbon carrier-metal nanoparticle composite prepared according to Comparative Example 3. Referring to FIG. 13, it could be confirmed that metal nanoparticles were not formed in the form of a uniform sphere, were not well dispersed on the carbon carrier, and were aggregated. In addition, it could be confirmed that most of the metal nanoparticles supported on the carbon carrier were not well dispersed because the metal nanoparticles were distributed while the distance between two adjacent particles is more than 10 times the particle diameter. Furthermore, in this case, the average particle diameter of metal nanoparticles was 7.78 nm, the standard deviation was 3.47 nm, and the CV value was 44.6%, and thus, it could be confirmed that the size of the particles prepared was not uniform.

Comparative Example 4

A carbon carrier-metal nanoparticle composite was prepared by using the same method as in Example 2, except that the surfactant was not used. FIG. 14 illustrates a transmission electron microscope (TEM) image of a carbon carrier-metal nanoparticle composite prepared according to Comparative Example 4. Referring to FIG. 14, it could be confirmed that metal nanoparticles were not well formed and metal particles were aggregated, and that the carbon carrier was also not well dispersed and was aggregated. Further, in this case, the average particle diameter of metal nanoparticles was 19.08 nm, the standard deviation was 17.25 nm, and the CV value was 90.4%, and thus, it could be confirmed that the size of the particles prepared was not uniform.

The exemplary embodiments of the present invention have been described with reference to the accompanying drawings, but the present invention is not limited to the exemplary embodiments, but may be prepared in various forms, and a person with ordinary skill in the art to which the present invention belongs will understand that the present invention can be implemented in another specific form without changing the technical spirit or essential feature of the present invention. Therefore, the exemplary embodiments described above should be understood as illustrative rather than limiting in all respects.

The invention claimed is:

1. A method for preparing a carbon carrier-metal nanoparticle composite, the method comprising:
    forming a solution comprising a carbon carrier in which a hydrophilic functional group is induced on a surface of a carbon carrier by mixing the carbon carrier and a surfactant in a solvent;
    mixing a first metal salt and a second metal salt by adding the first metal salt and the second metal salt to the solution; and
    forming metal nanoparticles by adding a reducing agent to the solution,
    wherein the solvent is water,
    wherein the metal nanoparticles have a CV value of 30% or less, and the CV value is represented by the following Equation 1, $$CV(\%) = \frac{\text{Standard deviation of particles}}{\text{Average particle diameter}} \times 100,$$

and wherein the first metal salt is represented by the following Chemical Formula 1 and the second metal salt is represented by the following Chemical Formula 2

$$XA_m \qquad \text{[Chemical Formula 1]}$$

$$B_pYC_q \qquad \text{[Chemical Formula 2]}$$

wherein in Chemical Formula 1 and Chemical Formula 2,

X is an ion of nickel (Ni),

Y is an ion of platinum (Pt)

A and C are each independently selected from the group consisting of $NO^{3-}$, $NO^{2-}$, $OH^-$, $F^-$, $Cl^-$, $Br^-$, and $I^-$, and B is selected from the group consisting of $K^+$, $Na^+$, and $NH^{3+}$, M is 2, p is 2, and q is 4 or 6.

2. The method of claim 1, wherein the metal nanoparticles are an alloy of a first metal and a second metal.

3. The method of claim 1, wherein in the mixing, a stabilizer is further added.

4. The method of claim 1, wherein in the forming of the solution, an ultrasonic wave is applied before or after the carbon carrier and the surfactant are mixed.

5. The method of claim 1, wherein a content of the surfactant is 1 to 40 times a weight of the carbon carrier.

6. The method of claim 1, wherein the carbon carrier is a carbon carrier which is not subjected to pre-treatment.

7. The method of claim 1, wherein a molar ratio of the first metal salt and the second metal salt in the solution is 1:5 to 10:1.

8. The method of claim 1, wherein the metal nanoparticles have an average particle diameter of 30 nm or less.

9. The method of claim 1, wherein a supporting ratio of the metal nanoparticles with respect to the carbon carrier is 10 wt % to 70 wt %.

10. The method of claim 1, wherein the metal nanoparticles comprise 80% or more of particles in which a distance between two adjacent particles among metal nanoparticles supported on the carbon carrier is 10 times or less the particle diameter.

11. A carbon carrier-metal nanoparticle composite comprising a carbon carrier in which a hydrophilic functional group is induced on the surface thereof and metal nanoparticles comprising nickel (Ni) and platinum (Pt), wherein the metal nanoparticles have an average particle diameter of 30 nm or less, the metal nanoparticles are supported on the carbon carrier, and the metal nanoparticles have a CV value of 30% or less, and the CV value is represented by the following Equation 1:

$$CV(\%) = \frac{\text{Standard deviation of particles}}{\text{Average particle diameter}} \times 100. \qquad \text{[Equation 1]}$$

12. The carbon carrier-metal nanoparticle composite of claim 11, wherein a supporting ratio of the metal nanoparticles with respect to the carbon carrier is 10 wt % to 70 wt %.

13. The carbon carrier-metal nanoparticle composite of claim 11, wherein the metal nanoparticles comprise 80% or more of particles in which a distance between two adjacent particles among metal nanoparticles supported on the carbon carrier is 10 times or less the particle diameter.

14. The carbon carrier-metal nanoparticle composite of claim 11, wherein the metal nanoparticles have an average particle diameter of 10 nm or less.

15. The carbon carrier-metal nanoparticle composite of claim 11, wherein a specific surface area of the carbon carrier is 90% to 100% of a specific surface area of the carbon carrier before the hydrophilic functional group is induced.

16. The carbon carrier-metal nanoparticle composite of claim 11, wherein electrical conductivity of the carbon carrier is 90% to 120% of the electrical conductivity of the carbon carrier before the hydrophilic functional group is induced.

* * * * *